United States Patent
Schultes et al.

(10) Patent No.: US 7,179,852 B2
(45) Date of Patent: Feb. 20, 2007

(54) PMMA MOULDING COMPOUNDS WITH IMPROVED IMPACT RESISTANCE

(75) Inventors: Klaus Schultes, Wiesbaden (DE); Thomas Suefke, Erzhausen (DE); Reiner Mueller, Biebesheim (DE); Thomas Arndt, Luetzelbach (DE); Goerg Michler, Langenbogen (DE); Joachim Laatsch, Aachen (DE)

(73) Assignee: Roehm GmbH & Co. KG, Darmstadt (DE)

( * ) Notice: Subject to any disclaimer, the term of this patent is extended or adjusted under 35 U.S.C. 154(b) by 0 days.

(21) Appl. No.: 10/363,319

(22) PCT Filed: Jul. 26, 2001

(86) PCT No.: PCT/EP01/08631

§ 371 (c)(1),
(2), (4) Date: Aug. 18, 2003

(87) PCT Pub. No.: WO02/20634

PCT Pub. Date: Mar. 14, 2002

(65) Prior Publication Data

US 2004/0030046 A1    Feb. 12, 2004

(30) Foreign Application Priority Data

Sep. 4, 2000    (DE) ................. 100 43 868

(51) Int. Cl.
*C08L 51/04*    (2006.01)
*C08F 265/06*    (2006.01)
*C08F 285/00*    (2006.01)

(52) U.S. Cl. ............ 523/201; 524/458; 524/523; 524/525; 525/85; 525/902

(58) Field of Classification Search ........... 523/201; 524/458, 523, 525; 525/85, 902
See application file for complete search history.

(56) References Cited

U.S. PATENT DOCUMENTS

| | | | | |
|---|---|---|---|---|
| 3,793,402 A | * | 2/1974 | Owens | 525/81 |
| 5,270,397 A | * | 12/1993 | Rhein et al. | 525/309 |
| 5,286,801 A | * | 2/1994 | Besecke et al. | 525/307 |
| 6,355,712 B1 | | 3/2002 | Schultes et al. | |

FOREIGN PATENT DOCUMENTS

| | | |
|---|---|---|
| DE | 195 23 465 | 1/1997 |
| EP | 0 113 924 | 7/1984 |
| EP | 0 512 333 | 11/1992 |
| EP | 0 745 622 | 12/1996 |

* cited by examiner

*Primary Examiner*—Kelechi C. Egwim
(74) *Attorney, Agent, or Firm*—Oblon, Spivak, McClelland, Maier & Neustadt, P.C.

(57) ABSTRACT

The invention relates to a novel impact-resistance modifier, constructed from a core-shell 1 and a shell 2, whereby the core is plastically deformable. The invention is characterised by excellent mechanical properties obtained by a low content of impact-resistance modifier.

21 Claims, No Drawings

PMMA MOULDING COMPOUNDS WITH IMPROVED IMPACT RESISTANCE

FIELD OF THE INVENTION

The invention relates to multistage emulsion polymers intended mainly for blending with hard and relatively brittle plastics in order to improve their toughness properties. They are frequently termed impact modifiers, although they can also be processed on their own as a moulding composition for producing impact-resistant mouldings, films, or the like.

Their fundamental structure made from a hard, non-elastomeric core, from an elastomeric intermediate stage and from a hard, non-elastomeric final stage is given in the precharacterizing clause of the patent claim. The polymers of the intermediate stage and of the final stage are assumed to have a shell-type arrangement around the core.

PRIOR ART

Many impact modifiers prepared by emulsion polymerization and made from an elastomeric core and from a hard, non-elastomeric shell are known from the prior art.

According to U.S. Pat. No. 3,661,994, these emulsion polymers were improved by producing a hard core as first stage of the emulsion polymer and producing one elastomeric and one hard shell by way of two subsequent stages of polymerization. The elastomeric shell has crosslinking by divinyl monomers, such as divinylbenzene or butylene dimethacrylate.

According to U.S. Pat. No. 3,793,402, the emulsion polymers were further improved by using two different crosslinkers in the elastomeric phase. One type of crosslinker is termed "polymerization crosslinker" and contains two or more polymerizable double bonds which have the same polymerization rate as the monounsaturated main monomer which forms most of the elastomeric phase. The crosslinker brings about internal crosslinking of the elastomeric phase and has been completely consumed by the time that the polymerization of the elastomeric stage has been concluded. Examples mentioned are diacrylates and dimethacrylates of diols, and divinyl- and trivinylbenzene.

The second type of crosslinker which must be used simultaneously is termed "graft crosslinker". It contains one polymerizable double bond whose polymerization rate is the same as that of the main monomer, and another polymerizable double bond whose polymerization rate is markedly lower. At least some of the last-named double bonds are retained unaltered when the polymerization of the main monomer has been completed, and they are gradually consumed during the continuation of the polymerization in the third stage. They therefore bring about crosslinking of the elastomeric second stage with the hard third stage.

This twofold crosslinking has proven important for avoiding what is known as "stress whitening". This means lasting local whitening of an otherwise clear and transparent moulding at sites where it has been exposed to severe strain or impact. Stress whitening is interpreted as production of fissures or areas of break-away between the continuous hard phase of the moulding and the elastomeric phase phase embedded and finely distributed therein. In line with this interpretation, the crosslinking of the elastomeric phase with the hard phase eliminates areas of break-away of the two phases and therefore also eliminates undesirable stress whitening under tensile stress. However, if the proportion of the graft crosslinker can be increased until stress whitening completely disappears, a reduction in toughness, in particular in impact strength, can be observed.

The more recent Patent No. EP 0 828 772 "Impact modified (Meth)acrylic Polymers" claims impact modifiers identical with those in U.S. Pat. No. 3,793,402. The core/shell or core/shell particles claimed in the first claim have the following build:

a. Core: poly(meth)acrylate
b. Shell 1 (more than 65% by volume of the entirety of core and shell 1): polymer made from 75 to 100% by weight of (meth)acrylates ($T_g$ of their homopolymers is from −75 to 5° C.)
   from 0 to 25% by weight of styrenic derivatives
c. Shell 2 (optional): poly(meth)acrylate as core or differing from core build
d. Core and shell 1 contain a graft crosslinker (total content from 0.5 to 1%, based on core and shell 1)
e. No incorporation of any vinylically unsaturated compound which encompasses at least two double bonds of the same reactivity In the examples, there is some incorporation of butyl acrylate (up to 8% by weight) in core and shell 2, besides MMA, but although this gives another formulation for the core (and the shell) it does not give any significant increase in the impact strength (increase of Izod notch impact strength from 7 (1% by weight of butyl acrylate) to a maximum of 8.3 kJ/m$^2$). Nor is the refractive index of the core matched to the matrix by way of other monomers (such as styrene).

In the article "Investigation of the Micromechanical Deformation Behavior of Transparent Toughened Poly(methylmethacrylate) Modified with Core-Shell Particles" in Polymers for Advanced Technologies, 9, 716–20 (1998), the authors J. Laatsch, G.-M. Kim, G. H. Michler, T. Arndt and T. Süfke discuss the micromechanical behaviour of impact-resistant PMMA, using electron micrographs. The content of impact-modifying rubber particles here is varied from 4 to 35% by volume, based on the PMMA matrix.

FIGS. 6 and 7 in the article are evidence that the impact-modifying particles deform only within the rubber phase, no deformation of the core occurring.

OBJECT

The intention was then to find an effective modifier which improves the impact strength of PMMA moulding composition over prior-art impact-modified moulding compositions. However, there is to be no or very little resultant sacrifice of melt viscosity, die swell, modulus of elasticity or Vicat softening point of the moulding compositions concerned through using the nominal modifier.

SOLUTION

A softer formulation for the cores in the C/S1/S2 modifiers can markedly raise the impact strength of the moulding compositions while using the same amounts of impact modifier in the moulding composition. This softer formulation is achieved by incorporating 7% by weight or more (based on core monomers) of a C2–C8-alkyl acrylate within the core. Optical properties may optionally be maintained at the same level by adjusting the refractive index within the core (by copolymerizing styrene).

The increased impact strength of the moulding compositions equipped with the novel C/S1/S2 modifiers comes about through the ability of the core (C) to undergo plastic deformation. The core is not elastomeric like the shell (S1) but deforms under high levels of mechanical stress.

The C/S1/S2 impact modifier is a polymer with the following monomer build:

Core (A): from 53 to 92.3% by weight of alkyl methacrylate, where the alkyl group may have from 1 to 8 carbon atoms,
from 7 to 35% by weight of alkyl acrylate, where the alkyl group may have from 1 to 8 carbon atoms,
from 0.1 to 2% by weight of crosslinker or crosslinker mixture
from 0 to 8% by weight of styrene derivatives Shell (1) from 75 to 99.9% by weight of alkyl acrylate, where the alkyl group may have from 1 to 8 carbon atoms,
from 0 to 25% by weight of styrene derivatives
from 0.1 to 2% by weight of crosslinker Shell (2) from 80 to 100% by weight of alkyl methacrylates, where the alkyl group may have
from 1 to 8 carbon atoms, from 0 to 20% by weight of alkyl acrylates, where the alkyl group may have from 1 to 8 carbon atoms,
from 0.1 to 5% by weight of regulator or regulator mixture The term alkyl methacrylates used above is taken to mean esters of methacrylic acid, for example methyl methacrylate, ethyl methacrylate, propyl methacrylate, isopropyl methacrylate, n-butyl methacrylate, isobutyl methacrylate, tert-butyl methacrylate, pentyl methacrylate, hexyl methacrylate, heptyl methacrylate, octyl methacrylate, isooctyl methacrylate and ethylhexyl methacrylate, and also cycloalkyl methacrylates, such as cyclohexyl methacrylate.

The term alkyl acrylates used above is taken to mean esters of acrylic acid, for example methyl acrylate, ethyl acrylate, propyl acrylate, isopropyl acrylate, n-butyl acrylate, isobutyl acrylate, tert-butyl acrylate, pentyl acrylate, hexyl acrylate, heptyl acrylate, octyl acrylate, isooctyl acrylate and ethylhexyl acrylate, and also cycloalkyl acrylates, such as cyclohexyl acrylate.

Styrenes which may be used are styrene, substituted styrenes with an alkyl substituent in the side chain, e.g. α-methylstyrene and α-ethylstyrene, substituted styrenes with an alkyl substituent on the ring, such as vinyltoluene and p-methylstyrene, and halogenated styrenes, such as monochlorostyrenes, dichlorostyrenes, tribromostyrenes and tetrabromostyrenes.

Examples of crosslinkers used are the following compounds.

(a) Bifunctional (meth)acrylates
Compounds of the general formula

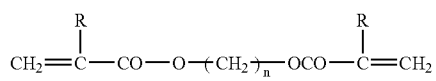

where R is hydrogen or methyl and n is a positive integer from 3 to 20, e.g. the di(meth)acrylate of propanediol, of butanediol, of hexanediol, of octanediol, of nonanediol, of decanediol or of eicosanediol;
compounds of the general formula:

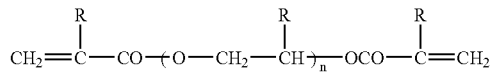

where R is hydrogen or methyl and n is a positive integer from 1 to 14, e.g. the di(meth)acrylate of ethylene glycol, of diethylene glycol, of triethylene glycol, of tetraethylene glycol, of dodecaethylene glycol, of tetradecaethylene glycol, of propylene glycol, of dipropyl glycol, or tetradecapropylene glycol.

Other crosslinkers which may be used are glycerol di(meth)acrylate, 2,2'-bis[p-(γ-methacryloxy-β-hydroxypropoxy)phenylpropane] or bis-GMA, bis-phenol A dimethacrylate, neopentyl glycol di-(meth)acrylate, 2,2'-di(4-methacryloxypolyethoxyphenyl)propane having from 2 to 10 ethoxy groups per molecule and 1,2-bis(3-methacryloxy-2-hydroxypropoxy)butane.

(b) Tri- or multifunctional (meth)acrylates, such as trimethylolpropane tri(meth)acrylates and pentaerythritol tetra(meth)acrylate.

(c) Other crosslinkers which may be used are allyl methacrylate or allyl acrylate. Divinylbenzenes may also be used.

The chain lengths of the copolymers in S2 may be adjusted by polymerizing the monomer mixture in the presence of molecular weight regulators, in particular of the mercaptans known for this purpose, such as n-butyl mercaptan, n-dodecyl mercaptan, 2-mercaptoethanol or 2-ethylhexyl thioglycolate or pentaerythritol tetrathioglycolate; the amounts used of the molecular weight regulators generally being from 0.05 to 5% by weight, based on the monomer mixture, preferably from 0.1 to 2% by weight and particularly preferably from 0.2 to 1% by weight based on the monomer mixture (cf., for example, H. Rauch-Puntigam, Th. Völker, "Acryl- und Methacrylverbindungen" [Acrylic and methacrylic compounds], Springer, Heidelberg, 1967; Houben-Weyl, Methoden der organischen Chemie [Methods of organic chemistry], Vol. XIV/1, p. 66, Georg Thieme, Heidelberg, 1961 or Kirk-Othmer, Encyclopedia of Chemical Technology, Vol. 1, pp. 296 et seq., J. Wiley, New York, 1978). n-Dodecyl mercaptan is preferably used as molecular weight regulator.

Examples of polymerization initiators which should be mentioned are: azo compounds, such as 2,2'-azobis(isobutyronitrile) and 2,2'-azobis(2,4-di-methylvaleronitrile), redox systems, such as the combination of tertiary amines with peroxides or sodium disulphite and persulphates of potassium, sodium or ammonium or preferably peroxides (cf. in this connection, for example, H. Rauch-Puntigam, Th. Völker, "Acryl- und Methacrylverbindungen" [Acrylic and methacrylic compounds], Springer, Heidelberg, 1967 or Kirk-Othmer, Encyclopedia of Chemical Technology, Vol. 1, pp. 386 et seq., J. Wiley, New York, 1978). Examples of suitable peroxide polymerization initiators are dilauroyl peroxide, tert-butyl peroctoate, tert-butyl perisononanoate, dicyclohexyl peroxidicarbonate, dibenzoyl peroxide and 2,2-bis(tert-butylperoxy)butane. Also preferred is to carry out the polymerization with a mixture of various polymerization initiators of differing half-life times, for example dilauroyl peroxide and 2,2-bis(tert-butylperoxy)butane, in order to hold the flow of free radicals constant during the course of the polymerization or else at various polymerization temperatures. The amounts used of polymerization initiator are generally from 0.01 to 2% by weight, based on the monomer mixture.

The monomer build selected within the core is generally such that the calculated glass transition temperature $T_{gcore}$, calculated by the Fox equation, is 30° C. to 105° C.

Calculation of Glass Transition Temperature by the Fox Equation.

The glass transition temperature of copolymers can be approximated from the glass transition temperature of the homopolymers with the aid of the Fox equation.

$$\frac{1}{T_{g\ Mischung}} = W1/T_{g1} + W2/T_{g2}$$

(Hans-Georg Elias, Polymere [Polymers], Hüthig, p. 263, 1996).

W: Fraction of component by weight
Tg: Glass transition temperature of component in Kelvin
The following values were used for glass transition temperatures:

| | K |
|---|---|
| Polybutyl acrylate: | 219 |
| Polyethyl acrylate: | 249 |
| Polymethyl methacrylate | 378 |
| Polystyrene | 382 |

The values for the glass transition temperatures of the homopolymers are taken from the Polymer Handbook, 3rd edition, 1989.

The proportions by weight of the core and the shells are from 15 to 35% by weight of core material, from 5 to 30% by weight of material of shell 1 and from 10 to 40% by weight of material of shell 2, the proportions giving 100% by weight in total.

General Preparation Specification for Core/Shell 1/Shell 2 Particles:

1.) Seed Latex
   The seed latex is prepared by emulsion polymerization and its monomer build is 98% by weight of ethyl acrylate and 2% by weight of allyl methacrylate. These particles, of size about 20 nm, have a concentration of about 10% by weight in water.

2.) Preparation of Impact Modifiers
   Water is charged to the vessel at from 40 to 60° C., with stirring, and the seed latex is charged and the feed of emulsion 1 begun (feed duration: from 0.5 to 2 hours). Once the feed has ended and after a waiting time of from 0.25 to 1 hour, the feed of emulsion 2 is begun. Feed duration: from 1.0 to 2.0 hours.
   Once the feed has ended and after a waiting time of from 0.25 to 1 hour, the feed of emulsion 3 is begun. Feed duration: from 1.0 to 2.0 hours.
   Emulsion 1 comprises the monomer mixture which forms the core.
   Emulsion 2 comprises the monomer mixture which forms S1.
   Emulsion 3 comprises the monomer mixture which forms S2.
   The emulsifiers used are the conventional prior-art emulsifiers, for example as described in EP 828 772.
   To isolate the impact modifier, the dispersion is frozen at −20° C. for 2 d, then remelted, and the coagulated dispersion is separated off by way of a filter fabric. The solid is dried at 50° C. in a drying cabinet (duration: about 3 d)

Blending of Moulding Compositions
   A standard PMMA-based moulding composition, PLEXIGLASS® 7 N, is blended with 39.3% by weight of the respective impact modifier (based on the entire system) by means of an extruder.

Testing of Moulding Compositions
   Test specimens were produced from the blended moulding compositions. The following methods were used to test the moulding compositions or the corresponding test specimens:

Viscosity $\eta_s$ (220° C./5 MPa):
Melt viscosity determination, test standard: DIN 54811: 1984

Die Swell B:
Die swell determination, test standard: DIN 54811: 1984

Mini-Vicat (16 h/80° C.):
Vicat softening point determination using mini-Vicat system, test standard DIN ISO 306: August 1994

NIS (Charpy 179/IeU):
Charpy notch impact strength determination, test standard: ISO 179: 1993

Modulus of Elasticity
Modulus of elasticity determination, test standard: ISO 527-2

Transmittance (D 65/10°)
Transmittance measured for D65 and 10°, test standard: DIN 5033/5036

Haze
Haze measured on the BYK Gardner Hazeguard-plus haze meter, test standard: ASTM D 1003: 1997

(The results of the tests on the blends can be seen in Appendix 2.)

Advantages of the Moulding Compositions of the Invention
   The Charpy notch impact strength of each of the moulding compositions, both at 23° C. (from 7.5 to 10.9 kJ/m² for blends A–H, compared with 5.2 and 6.0 kJ/m² for comparison A and B respectively) and at −10° C. (from 3.2 to 4.8 kJ/m² for blends A–H, compared with 2.0 and 2.9 kJ/m² for comparison A and B respectively) is markedly higher (better) for comparable impact-modifier content. At the same time, melt viscosity, modulus of elasticity and Vicat softening point remain at a comparable level (difference about 5% of value) for all of the moulding compositions compared.
   Refractive index could be matched by incorporating styrene within the core (blends F, G and H), so that the haze approximates to the value for comparison B at both 23° C. and 40° C.
   If the concentration of the novel impact modifier used in the matrix were to be lowered, the NIS values obtained would be comparable with the comparative blends. At the same time there would be an increase in modulus of elasticity, Vicat softening point and die swell, and a lowering of melt viscosity, and the moulding compositions would therefore have better processing performance.
   The impact modifiers of the invention may also be used for preparing transparent moulding compositions. The term transparent moulding compositions is taken to mean moulding compositions whose haze (at 23° C.) is less than 4.

APPENDIX 1

Build for each Example

| | Unit | C. Ex. 1 | C. Ex. 1 | Ex. 1 | Ex. 2 | Ex. 3 | Ex. 4 | Ex. 5 | Ex. 6 | Ex. 7 | Ex. 8 |
|---|---|---|---|---|---|---|---|---|---|---|---|
| Core (C) | | | | | | | | | | | |
| Methyl methacrylate | % by wt | 99.7 | 95.70 | 92.7 | 89.7 | 84.7 | 79.7 | 69.7 | 84.7 | 83.7 | 82.7 |
| Ethyl acrylate | % by wt | | 4.00 | 7 | 10 | 15 | 20 | 30 | 14 | 14 | 14 |
| Allyl methacrylate | % by wt | 0.3 | 0.30 | 0.3 | 0.3 | 0.3 | 0.3 | 0.3 | 0.3 | 0.3 | 0.3 |
| Styrene | % by wt | | 0 | | | | | | 1 | 2 | 3 |
| Proportion of C in C/S1/S2 modifier | % by wt | 23 | 23 | 23 | 23 | 23 | 23 | 23 | 23 | 23 | 23 |
| Shell 1 (S1) | % by wt | | | | | | | | | | |
| Butyl acrylate | % by wt | 81.7 | 81.7 | 81.7 | 81.7 | 81.7 | 81.7 | 81.7 | 81.7 | 81.7 | 81.7 |
| Styrene | % by wt | 17.0 | 17.0 | 17.0 | 17.0 | 17.0 | 17.0 | 17.0 | 17.0 | 17.0 | 17.0 |
| Allyl methacrylate | % by wt | 1.3 | 1.3 | 1.3 | 1.3 | 1.3 | 1.3 | 1.3 | 1.3 | 1.3 | 1.3 |
| Proportion of S1 in C/S/S modifier | % by wt | 47 | 47 | 47 | 47 | 47 | 47 | 47 | 47 | 47 | 47 |
| Shell 2 (S2) | % by wt | | | | | | | | | | |
| Methyl methacrylate | % by wt | 96.0 | 96.0 | 96.0 | 96.0 | 96.0 | 96.0 | 96.0 | 96.0 | 96.0 | 96.0 |
| Ethyl acrylate | % by wt | 4.0 | 4.0 | 4.0 | 4.0 | 4.0 | 4.0 | 4.0 | 4.0 | 4.0 | 4.0 |
| Proportion of S1 in C/S/S modifier | % by wt | 30 | 30 | 30 | 30 | 30 | 30 | 30 | 30 | 30 | 30 |
| Radius of modifier | nm | 165 | 174 | 157 | 152 | 178 | 154 | 168 | 169 | 152 | 168 |

*Radii measured with Coulter N4 particle size determination apparatus

APPENDIX 2

Test results for blends of impact modifiers in moulding compositions

| Blend Modifier (see Appendix 1) | Unit | Comp. A C. Ex. 1 | Comp. B C. Ex. 1 | A Ex. 1 | B Ex. 2 | C Ex. 3 | D Ex. 4 | E Ex. 5 | F Ex. 6 | G Ex. 7 | H Ex. 8 |
|---|---|---|---|---|---|---|---|---|---|---|---|
| Modifier content in PLEXIGLAS ® 7N | % | 39.3 | 39.3 | 39.3 | 39.3 | 39.3 | 39.3 | 39.3 | 39.3 | 39.3 | 39.3 |
| Property | | | | | | | | | | | |
| Viscosity ηs (220° C./5 MPa) | Pas | 2120 | 2780 | 2890 | 2710 | 2800 | 2690 | | 3030 | 2680 | 2770 |
| Die swell B | % | 21.4 | 11.0 | 8.5 | 9.3 | 8.0 | 8.2 | | 9.3 | 12.5 | 11.8 |
| Mini-Vicat (16 h/80° C.) | ° C. | 99.8 | 95.5 | 94.4 | 94.4 | 93.2 | 93.4 | | 95.5 | 94.1 | 93.3 |
| NIS (Charpy 179/1eU) 23° C. | kJ/m² | 5.2 | 6.0 | 7.5 | 10.5 | 8.6 | 10.9 | 11 | 7.9 | 8.1 | 9.1 |
| 10° C. | kJ/m² | 2.0 | 2.9 | 3.5 | | 4.7 | | | 3.2 | 3.3 | 4.8 |
| Modulus of elasticity | MPa | 2180 | 1805 | 1729 | 1740 | 1688 | 1766 | 1797 | 1814 | 1777 | 1759 |
| Transmittance (D 65/10°) | % | 89.1 | 88.7 | 89.6 | 87.8 | 88.4 | 86.9 | 85.0 | 87.0 | 88.6 | 87.24 |
| Haze 23° C. | % | 1.2 | 1.3 | 1.6 | 1.4 | 2.9 | 2.4 | 3.97 | 1.4 | 1.5 | 1.1 |
| 40° C. | % | 5.43 | 5.39 | 5.33 | 5.57 | 8.77 | 7.86 | | 5.47 | 5.23 | 5.52 |

The invention claimed is:

1. A molding composition comprising from 3 to 80% by weight of the impact modifier consisting of a multistage emulsion polymer of bonded units of:
   i) a plastically deformable core (C) of the following polymerized monomeric components:
      a) from 53 to 92.9% by weight of $C_1$–$C_8$-alkyl methacrylate
      b) from 7 to 35% by weight of $C_1$–$C_8$-alkyl acrylate
      c) from 0.1 to 2% by weight of at least one crosslinker, and
      d) from 1 to 5% by weight of one or more styrene derivatives;
   ii) an elastomeric first shell (S1) of the following polymerized monomeric components:
      a) from 75 to 99.9% by weight of at least one $C_1$–$C_8$-alkyl acrylate
      b) from 0 to 25% by weight of one or more styrene derivatives, and
      c) from 0.1 to 2% by weight of at least one crosslinker, and
   iii) a hard second shell (S2), of the following polymerized monomeric components:
      a) from 80 to 100.00% by weight of at least one $C_1$–$C_8$-alkyl methacrylate,
      b) from 0 to 20% by weight of at least one $C_1$–$C_8$-alkyl acrylate, and
      c) from 0 to 5% by weight of at least one regulator, and from 97 to 20% by weight of a thermoplastic molding composition comprising polymerized units of methyl methacrylate.

2. The molding composition according to claim 1, wherein the D65/10° transmittance of the composition is greater than 70% and less than 92%.

3. The molding composition according to claim 1, wherein the D65/10° transmittance of the composition is greater than 80% and less than 92%.

4. The molding composition according to claim 1, wherein the D65/10° transmittance of the composition is greater than 87% and less than 92%.

5. The molding composition according to claim 1, wherein the impact modifier comprises from 15 to 35% by weight of the core (C), from 30 to 55% by weight of the first shell (S1), and from 10 to 40% by weight of the second shell (S2).

6. The molding composition according to claim 1, wherein the core (C) of the impact modifier comprises at least from 7–35% by weight of ethyl acrylate.

7. The molding composition according to claim 1, wherein the core (C) of the impact modifier comprises at least from 5 to 30% by weight of butyl acrylate.

8. The molding composition according to claim 1, wherein the second shell (S2) is obtained by polymerizing the monomeric components in the presence of from 0.1 to 1% by weight of at least one regulator, wherein % by weight is based on the entirety of monomers and regulator in S2.

9. The molding composition according to claim 1, wherein the at least one crosslinker of core (C) and shell (S1) is a bifunctional (meth)acrylate of the formula:

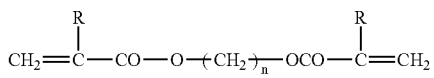

wherein R is hydrogen, or methyl and n is an integer from 3 to 20, or of the formula:

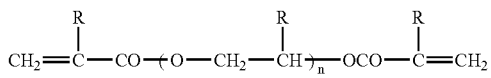

wherein R is hydrogen, or methyl and n is an integer from 1 to 14.

10. The molding composition according to claim 1, wherein the molding composition, when mixed with a PMMA matrix material, produces a molded product that has a haze value at 23° C. ranging from 1.1 to 3.97%.

11. A molding composition comprising from 3 to 80% by weight of the impact modifier consisting of a multistage emulsion polymer of bonded units of:
  i) a plastically deformable core (C) of the following polymerized monomeric components:
    a) from 53 to 92.9% by weight of $C_1$–$C_8$-alkyl methacrylate
    b) from 7 to 35% by weight of $C_1$–$C_8$-alkyl acrylate
    c) from 0.1 to 2% by weight of at least one crosslinker, and
    d) from 0 to 8% by weight of one or more styrene derivatives;
  ii) an elastomeric first shell (S1) of the following polymerized monomeric components:
    a) from 75 to 99.9% by weight of at least one $C_1$–$C_8$-alkyl acrylate
    b) from 0 to 25% by weight of one or more styrene derivatives, and
    c) from 0.1 to 2% by weight of at least one crosslinker, and
  iii) a hard second shell (S2), of the following polymerized monomeric components:
    a) from 80 to 100.00% by weight of at least one $C_1$–$C_8$-alkyl methacrylate,
    b) from 0 to 20% by weight of at least one $C_1$–$C_8$-alkyl acrylate, and
    c) from 97 to 20% by weight of a thermoplastic molding composition comprising polymerized units of methyl methacrylate;
  wherein the second shell (S2) is obtained by polymerizing the monomeric components in the presence of from 0.1 to 1% by weight of at least one regulator, wherein % by weight is based on the entirety of monomers and regulator in S2.

12. The molding composition according to claim 11, wherein the D65/10° transmittance of the composition is greater than 70% and less than 92%.

13. The molding composition according to claim 11, wherein the D65/10° transmittance of the composition is greater than 80% and less than 92%.

14. The molding composition according to claim 11, wherein the D65/10° transmittance of the composition is greater than 87% and less than 92%.

15. A molding comprising the molding composition according to claim 11.

16. The molding composition according to claim 11, wherein the impact modifier comprises from 15 to 35% by weight of the core (C), from 30 to 55% by weight of the first shell (S1), and from 10 to 40% by weight of the second shell (S2).

17. The molding composition according to claim 11, wherein the core (C) of the impact modifier comprises at least from 1 to 5% by weight of one or more styrene derivatives.

18. The molding composition according to claim 11, wherein the core (C) of the impact modifier comprises at least from 7–35% by weight of ethyl acrylate.

19. The molding composition according to claim 11, wherein the core (C) of the impact modifier comprises at least from 5 to 30% by weight of butyl acrylate.

20. The molding composition according to claim 11, wherein the at least one crosslinker of core (C) and shell (S1) is a bifunctional (meth)acrylate of the formula:

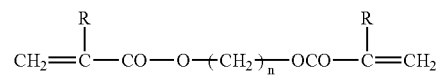

wherein R is hydrogen, or methyl and n is an integer from 3 to 20, or of the formula:

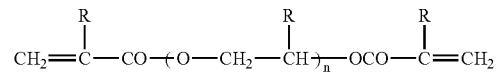

wherein R is hydrogen, or methyl and n is an integer from 1 to 14.

21. The molding composition according to claim 11, wherein the molding composition, when mixed with a PMMA matrix material, produces a molded product that has a haze value at 23° C. ranging from 1.1 to 3.97%.

* * * * *